W. B. LONGEST.
UNIT COMPARTMENT DUMPING BODY.
APPLICATION FILED MAY 29, 1911.
1,013,789.
Patented Jan. 2, 1912.
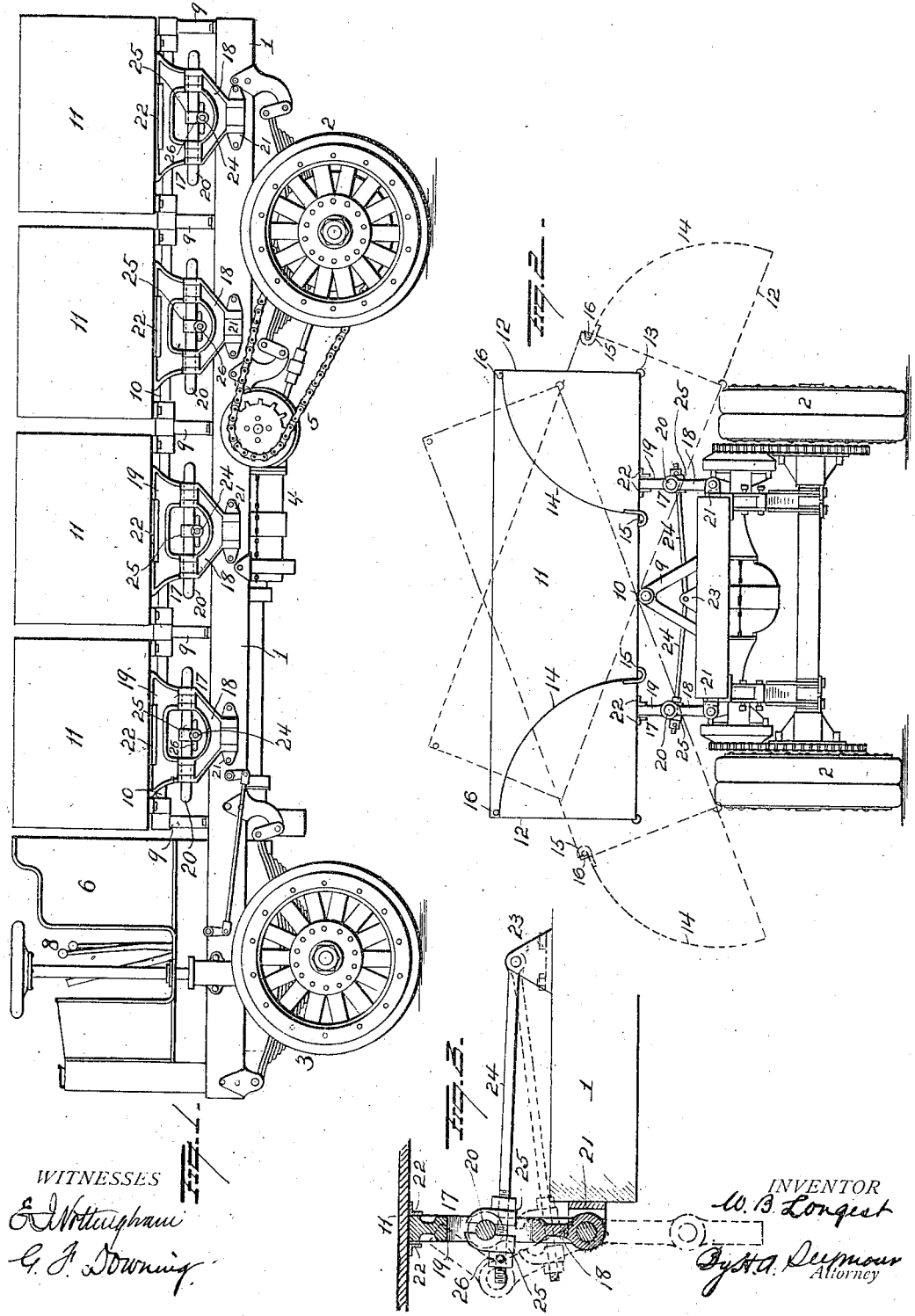

UNITED STATES PATENT OFFICE.

WILLIAM B. LONGEST, OF LOUISVILLE, KENTUCKY.

UNIT-COMPARTMENT DUMPING-BODY.

1,013,789.    Specification of Letters Patent.    Patented Jan. 2, 1912.

Application filed May 29, 1911. Serial No. 630,273.

*To all whom it may concern:*

Be it known that I, WILLIAM B. LONGEST, a citizen of the United States, residing at Louisville, in the county of Jefferson and State of Kentucky, have invented a new and useful Unit-Compartment Dumping-Body, of which the following is a specification.

This invention relates to improvements in dumping vehicles, and more particularly to the body portion thereof and means for controlling the same.

The object of my present invention is to so construct a dumping vehicle that its body portion shall comprise a plurality of compartments or units arranged transversely and mounted so as to be capable of being independently tilted to dump the contents at either side of the vehicle.

A further object is to provide a dumping vehicle having a plurality of independent transversely-disposed compartments, with simple and efficient means for normally sustaining the compartments in horizontal position and permit any of them to be dumped independently of the others at either side of the vehicle.

With these and other objects in view, the invention consists in certain novel features of construction and combinations of parts as hereinafter set forth and pointed out in the claims.

In the accompanying drawings, Figure 1 is a side elevation of a vehicle embodying my improvements; Fig. 2 is an end view with one of the compartments or units shown in different dumping positions, by dotted lines, and Fig. 3 is an enlarged detail view showing the supporting means.

1 represents the elongated platform of a motor vehicle, said platform being suitably supported on trucks 2—3. A motor 4 is supported by the platform and connected by suitable gearing 5 with the wheels of the rear truck,—a driver's seat 6 and controlling mechanism 8 being located upon the forward end of the platform. A number of brackets 9 are located upon the platform in line with the longitudinal center thereof and serve to support a long, horizontal shaft 10 which extends from the driver's seat to the rear end of the platform. The brackets 9 are each located between the adjacent sides of two adjacent compartments the latter being provided with bearings at their side edges which are mounted and supported upon the horizontal shaft 10 at points on opposite sides of the bracket.

Each body unit or compartment is of sufficient length to overhang or extend laterally beyond the lines of the wheels of the vehicle as clearly shown in Fig. 2, and at both ends of each body unit or compartment, gates 12 are provided. Each gate is hinged at its lower edge (as at 13) to a body unit, and is provided with side wings 14 which embrace the sides of the body unit when the door is closed. When a body unit is tilted in one direction or the other, the gate can be swung down as shown in Fig. 2 and made to form a chute which projects well beyond the line of the vehicle wheels, being held in such position by the engagement of hooks 15 on the gate wings 14 with pins 16 near the upper edge of the body unit.

The body units or compartments are normally supported in horizontal positions and permitted to be tilted toward either side of the vehicle, by means of devices which will now be described, but as the supporting and releasing devices for the several body units are the same, a detail description of one set of these devices will suffice for all.

Props or supports 17 are attached to respective sides of the platform 1 under the body unit and engages the bottom of the latter some distance laterally in both directions beyond its central support. Each prop 17 comprises two elongated members 18—19 hinged together by means of a pin or bar 20. The lower member 18 of the prop is contracted at its lower end and pivotally attached to brackets 21 secured to the edge of the platform 1. The upper edge of the upper prop member 19 is of considerable length so as to afford an extended bearing against the under face of the body unit and enters between flanges or angle irons 22 secured to said body unit to prevent accidental lateral displacement of said prop member 19. Beneath each body unit, a bracket 23 is secured upon the platform 1 and with this bracket, the inner ends of rods 24 are pivotally connected. A clamp 25 is located near the outer end of each rod 24 and in position to engage an intermediate portion of the pivot pin which connects the prop members. The outer end of the rod is threaded for the accommodation of a nut 26 for securing the clamp to said pivot pin. It is apparent that when the props are locked with their members disposed in vertical alinement with each other, the body unit will be firmly supported in a horizontal position.

When it is desired to dump any one of the several body units, the operator will first remove the clamp 25 from the prop at the side of the vehicle at which the body unit is to be dumped, and permit said clamp 25 and rod 24 to drop to the position shown in dotted lines in Fig. 3. The prop at this side of the vehicle can now be collapsed, withdrawing its upper member 19 from between the angle irons 22, and be permitted to drop to the dotted line position. The body unit can now be tilted on its central support on the long shaft 10 and the contents dumped, the chute formed by the open gate causing the material to be delivered a considerable distance laterally beyond the line of the vehicle, as before stated.

In the drawings I have shown the body of the vehicle as composed of four independent units or compartments but it is apparent that a greater or less number may be employed.

It will be observed that the several body units are disposed transversely of the vehicle, and therefore, any one or more of them can be dumped, without disturbing the equilibrium of the remainder of the load, or subjecting the vehicle to strains such as are experienced when the load on a vehicle is unequally distributed.

My improved vehicle is very valuable for delivering such material as coal, when it is desired to supply several orders in different localities, and when the coal or other material is to be discharged at one side or the other of a narrow alley where turning of the vehicle could not be accomplished.

My improvements are simple in construction and can be readily operated by a single person to accomplish the very desirable results hereinbefore stated.

Having fully described my invention what I claim as new and desire to secure by Letters-Patent, is:—

1. In a dumping vehicle, the combination with a wheeled frame, of a plurality of independent dumping body units disposed transversely over the same and each pivotally supported centrally between its ends, of a collapsible prop at each side of the pivotal support of each body unit, rods pivotally attached to the wheeled frame, and clamps mounted on said rods and adapted to be connected with the props to normally prevent collapse of the same.

2. In a dumping vehicle, the combination with a wheeled frame, a body unit disposed transversely over the same, and means constituting a central pivotal support for said body unit, of a prop at each side of the central support of said body member, each prop comprising two members and a hinge pin connecting said members, rods attached to the wheeled frame, and clamps carried by said rods and adapted to be removably secured to the hinge pins of said props.

W. B. LONGEST.

Witnesses:
P. S. LONGEST,
DALLAS E. FURLONG.